UNITED STATES PATENT OFFICE.

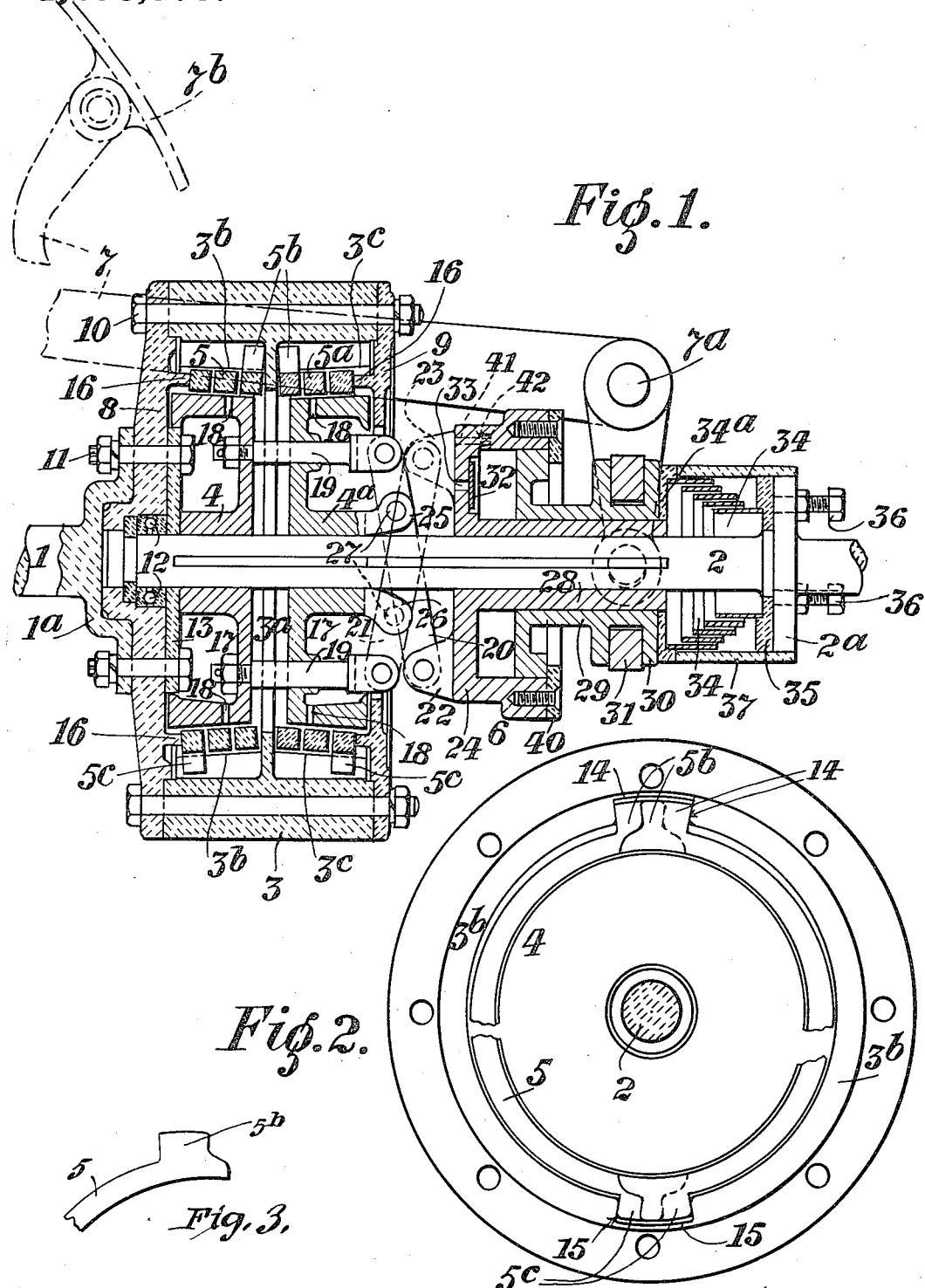

WILLIAM H. LINDSAY, OF JOHNSTONE, SCOTLAND.

CLUTCH.

1,298,975. Specification of Letters Patent. Patented Apr. 1, 1919.

Application filed September 17, 1917. Serial No. 191,760.

*To all whom it may concern:*

Be it known that I, WILLIAM HENRY LINDSAY, a subject of the King of Great Britain, residing at Johnstone, Scotland, have invented certain new and useful Improvements in and Relating to Clutches, of which the following is a specification.

This invention has for its object to provide a simple and effective form of clutch specially adapted for the control of motor driven vehicles or boats and also capable of being used for other purposes.

Under this invention the clutch, which is a double acting one, comprises an inner double member consisting of two movable truncated cones adapted to be engaged with and released from an outer double member which consists of two friction coils, secured to or connected with the driving, or driven, shaft in any suitable manner. The cones are moved simultaneously toward or away from one another by lever mechanism operated preferably by a dash-pot arrangement. The cones are arranged adjacent and they taper toward each other, the friction coils being similarly arranged externally of the cones.

In carrying out the invention, I, preferably, construct the clutch in the following manner:—I provide a ring having, at its interior, two tapered or conic surfaces with the smaller internal diameters adjacent each other. This ring can be secured to or made one with the fly-wheel which latter is secured to the engine driving shaft so as to revolve with it. On the inside of the conic surfaces are fitted two metal coils. The coils have a head on each end, these heads being fitted in slots in the ring aforesaid so that they are held in place by and caused to revolve with the ring. Within the coils aforesaid are two movable cones, or cone pulleys, or externally coned disks, the angle of inclination of the conic surfaces being similar to those of the outer ring. These movable cones, which have their smaller faces toward each other, are slidably carried on feathers on the driven shaft. The cones are preferably connected together by rods which are tapped into the one cone but pass freely through holes in the other cone. On the outer cone are two fulcrumed brackets which carry cross levers the short ends of the levers being connected with the rods aforesaid while their long ends are connected to a sliding collar mounted on the driven shaft. When this collar is moved, in any suitable manner, toward the clutch the cross levers press the one cone inward and pull the other cone outward both cones being thereby caused to simultaneously engage the friction coils and be clutched to the driving ring of the flywheel so that the driving shaft will drive the driven shaft through said clutch. As the two cones move together and are operated by the same levers it follows that the pressure on them is exactly equal and that no end pressure is set up. When the levers are drawn back, by means of the sliding collar, the cones are moved away from each other and the clutch is thereby disengaged.

By using the internal friction coils a great advantage is obtained as the cones first engage the outer convolutions and thereby tighten up the coils and gradually apply the clutch. Both ends of the coils are connected to the outer member so as to insure the coil tightening action at both forward and reverse drive.

It is necessary to keep the surfaces of the coils amply lubricated and to insure this the inside of the cones are hollowed out and a number of small oil holes are pierced therethrough. Oil placed in the hollows finds its way out under centrifugal action, to the under, or inside, of the coils and keeps their surfaces properly lubricated.

The sliding collar may be directly operated by lever gear but is, preferably, indirectly operated through a suitable form of cushioning device, such as a dash-pot arrangement. In this case the collar is made to form the end of a cylinder and has a long sleeve which is mounted on a feather on the driven shaft. Within the cylinder is a piston having a flange at its outer circumference and also a flange at its inner circumference this inner flange being prolonged to form a sleeve which works upon the collar sleeve. The piston is capable of being slid by lever or link gear and when moved backward it sucks air into the cylinder through an automatic non-return valve. When the suction ceases this valve closes but a small orifice is left through which air can escape, the percolation of the escaping air being regulated by means of a screw or the like. When the piston is moved forward, so as to apply the clutch, the air in the cylinder constitutes a cushion which prevents the too sudden engagement of the clutch. The piston may be operated by means of links (actuated by a lever or foot pedal) connected to a ring carried on the outer end of the piston sleeve.

The piston may, in some cases, be actuated through the intermediary of a spring whose one end is engaged by the piston sleeve and whose other end is engaged by a slidable collar carried on the shaft and provided with a back stop. This spring is compressed when the clutch is drawn out of gear and, when released, it expands and presses the piston into the cylinder, compressing the air therein and partially engaging the clutch without shock also thereby allowing an amount of slip which produces easy starting. As the air gradually escapes from the dash-pot the piston gradually moves up to the end of the air cylinder and finally drives the clutch home and holds it positively in gear.

The parts may be arranged so that the spring, when the pedal is released, can be used to apply the clutch and, when the pedal is depressed, the clutch can be drawn out of gear.

The pressure of the spring can be adjusted by means of an adjustable stop nut movable on a thread on the shaft or otherwise.

No pressure or strain is transmitted to the engine or gear box.

The clutch can drive equally well in either direction.

In order that the invention may be clearly understood I have hereunto appended an explanatory sheet of drawings whereon I have shown, by way of illustration or example, the preferred mode of constructing the clutch for vehicles and boats.

Figure 1 is a longitudinal vertical section of the clutch.

Fig. 2 is an end view with one of the cover plates removed and showing the arrangement of the parts.

Fig. 3 is a detail view of the head $5^b$ of coil 5.

On the drawing:—

1 is the driving shaft, 2 the driven shaft, 3 the fly-wheel or clutch case, 4, $4^a$, the two inner cones, 5, $5^a$, the two outer coils, 6 the dash-pot and 7 the operating lever.

As will be seen the fly-wheel 3 is made in the form of a ring which is carried by two plates one a driving plate 8 and the other, 9, a covering ring holding the coils in place. The plates are bolted to the ring by means of the bolts 10. The driving plate 8 is in its turn, bolted by means of the bolts 11 to the flange $1^a$ on the shaft 1. 12 is a ball thrust bearing and 13 a covering ring.

As will be seen the fly-wheel 3 is made at its interior with a central web $3^a$ and with inner tapering surfaces or ring parts $3^b$, $3^c$, these surfaces tapering from the web toward either side thus constituting two inner ring surfaces against which rest the two coils 5, $5^a$. $5^b$, $5^c$, are the heads and tails of the coils respectively these heads and tails, as shown at figure 2, engaging in recesses 14, 15, cut in the conic surfaces $3^b$, $3^c$. In Fig. 2 the one coil 5 is shown with head $5^b$ extending to the dotted line and with tail $5^c$ also extending to the dotted line the convolution being broken at the center to enable this to be so shown. The other coil is shown with head $5^b$ in full lines and the tail $5^c$ also in full lines, the convolution being broken in order that both ends of coil can be shown. The plates 8, 9, are made with inwardly extending ribs 16 which serve to hold the coils in place. The two truncated cones 4, $4^a$, are, as shown, arranged adjacent one another being located the one on one side of the web $3^a$, and the other on the other side and both being keyed to the shaft and capable of sliding freely thereon. These truncated cones, as will be seen, taper toward one another and they are made hollow to form chambers 17, for lubricant which can flow, under centrifugal action through the oil holes 18. The truncated cone 4 has rods 19 secured to it and which pass freely through holes in the cone $4^a$ the rods 19 being loosely jointed, respectively, to the cross levers 20, 21, working on lugs 22, 23, on the cylinder 24 of the dash-pot, this cylinder being slidably mounted on the shaft 2. The cone $4^a$ has two lugs 25, 26, and in these lugs the levers 20, 21 are fulcrumed by fulcrum pins 27. The cylinder 24 has an inner sleeve extension 28 upon which is slidably mounted a piston 29 having a ring 30 and actuated by a fork 31 operated by the bell crank lever 7 which is fulcrumed at $7^a$. The piston 29 works within the cylinder 24 which latter has an inlet valve 32 arranged over the inlet 33. It has also a restricted outlet 41 controllable by a screw 42. On the driving shaft 2 is a fixed collar $2^a$ and between this collar and the ring 30 a volute spring 34 is arranged. 35 is a washer which can be moved by means of the screws 36 so as to vary the tension of the spring. The spring is inclosed in the cylindrical case 37.

The spring 34, bearing against washer 35 on the one hand and the part $34^a$ next the ring 30 on the other, tends to throw the clutch into gear immediately the foot pedal $7^b$ is released. It is shown fully depressed in Fig. 1. The spring acts to push forward the piston 29 and compress the air within the cylinder 24 the pressure being transmitted through the air cushion to the cylinder 24 and lugs 22, 23, which again act upon the levers 20, 21, and simultaneously push the cone $4^a$ toward the left, Fig. 1, by acting upon the fulcrum pins 27, and pull the cone 4 toward the right by acting on the rods 19, the cones being, in this manner, simultaneously moved toward one another and, at the same time, caused to bite the friction coils 5, 5ª, thereby transmitting the drive from the driving to the driven shaft by coil clutch action. As the air cushion disperses, by percolation, through the orifice 41, the piston gradually approaches to and finally strikes against the end of the cylinder and positively operates the clutch.

When the clutch is to be disengaged the foot lever is depressed and, acting through the ring 30, it pulls the piston 29 backward at the same time causing the valve 32 to be opened and air to be sucked into the cylinder through the inlet 33. The partial vacuum which is created within the cylinder, owing to this action, tends to gradually disengage the clutch which is finally positively disengaged by the piston abutting against the retaining ring 40 secured to the rear of the cylinder.

With this construction of clutch the working pressures are not transmitted to the bearings of the machinery.

If so desired the pressure upon the clutch can be intensified and its power increased by slightly lifting the pedal lever 7.

Having now fully described my invention what I claim and desire to secure by Letters Patent is:—

1. A clutch comprising two inner members, an outer member, two coils located within and loosely attached to the outer member and means for causing the inner members to move simultaneously in opposite directions to engage said coils.

2. A clutch comprising two inner members, an outer member, two coils located within the outer member, means for causing the inner members to move simultaneously in opposite directions to engage said coils and means for loosely connecting both coils to the outer member.

3. A clutch comprising two inner members, two outer coil members, means for loosely holding said coil members in position outside of the inner members, cross levers connected to the inner members and means for moving the cross levers simultaneously.

4. A clutch comprising two inner members, two outer coil members, cross levers connected to the inner members, a dash-pot arrangement connected with the cross levers and adapted to move the same simultaneously.

5. A clutch comprising two inner members, two outer coil members, cross levers connected to the inner members, a dash-pot arrangement connected with the levers and acting in conjunction with a lever and spring to move the cross levers and inner members simultaneously.

6. A clutch comprising, in combination, an outer ring member connected with the driving shaft, tapered surfaces at the interior of said ring member, two tapered inner members slidably mounted on the driven shaft and feathered thereto, two coils arranged between the inner members and the outer ring member and loosely attached to the outer member, and means for moving the inner members in opposite directions simultaneously to engage the coils.

7. A clutch comprising, in combination, an outer ring member connected with the driving shaft having two oppositely tapered surfaces at its interior, two coils within and loosely attached to said outer member, two oppositely tapered inner members slidably mounted on the driven shaft and feathered thereto, cross levers connected to the inner members and means for operating the levers to move the inner members toward and away from one another and into and out of engagement with the coils.

8. A clutch comprising, in combination, an outer ring member connected with the driving shaft, two oppositely tapered surfaces at the interior of said ring member, two coils within and loosely attached to said outer member, two oppositely tapered inner members slidably mounted on the driven shaft and feathered thereto, a lever connected to one inner member, a lever connected to the other inner member these levers being crossed and means for operating the levers to move the inner members toward and away from one another.

9. A clutch comprising, in combination, an outer ring member connected with the driving shaft, two oppositely tapered surfaces at the interior of said ring member, two coils within said outer member, two oppositely tapered inner members slidably mounted on the driven shaft and feathered thereto, a lever connected to one inner member, a lever connected to the other inner member these levers being crossed and dash pot means for operating the levers to move the inner members toward and away from one another.

10. A clutch comprising two inner members, an outer member, two coils located within the outer member, means for causing the inner members to move simultaneously in opposite directions to engage said coils the coils having means at each end thereof for loosely retaining them in place in the outer member.

In testimony whereof I affix my signature in presence of two witnesses.

W. H. LINDSAY.

Witnesses:
 HUGH D. FITZPATRICK,
 MARY A. LINDSAY.